United States Patent
Geisler

(10) Patent No.: US 10,629,073 B2
(45) Date of Patent: Apr. 21, 2020

(54) METHOD, DEVICE AND SYSTEM FOR WRONG-WAY DRIVER DETECTION

(71) Applicant: Robert Bosch GmbH, Stuttgart (DE)

(72) Inventor: Simon Geisler, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/097,316

(22) PCT Filed: Apr. 18, 2017

(86) PCT No.: PCT/EP2017/059192
§ 371 (c)(1),
(2) Date: Oct. 29, 2018

(87) PCT Pub. No.: WO2017/211492
PCT Pub. Date: Dec. 14, 2017

(65) Prior Publication Data
US 2019/0139404 A1 May 9, 2019

(30) Foreign Application Priority Data

Jun. 7, 2016 (DE) .......................... 10 2016 210 032

(51) Int. Cl.
*G08G 1/056* (2006.01)
*G08G 1/01* (2006.01)
(Continued)

(52) U.S. Cl.
CPC ........... *G08G 1/056* (2013.01); *G08G 1/0112* (2013.01); *G08G 1/0133* (2013.01);
(Continued)

(58) Field of Classification Search
CPC .... G08G 1/056; G08G 1/0112; G08G 1/0133; G08G 1/0145; G08G 1/164; G08G 1/166; G01C 21/30
See application file for complete search history.

(56) References Cited

U.S. PATENT DOCUMENTS

| | | | |
|---|---|---|---|
| 2012/0290150 A1* | 11/2012 | Doughty | G08G 1/0116 701/2 |
| 2013/0304374 A1* | 11/2013 | Lee | G01C 21/26 701/445 |
| 2014/0350837 A1* | 11/2014 | Galbas | B60W 30/09 701/301 |

FOREIGN PATENT DOCUMENTS

| | | |
|---|---|---|
| DE | 102011120497 A1 | 6/2012 |
| DE | 102012208974 A1 | 12/2012 |

OTHER PUBLICATIONS

Tao Junli et al., "Wrong Roadway Detection for Multi-Lane Roads", Aug. 27, 2013 (Aug. 27, 2013), Network and Parallel Computing; Lecture Notes in Computer Science, Springer International Publishing, pp. 50-58, XP047038828 (Year: 2013).*

(Continued)

*Primary Examiner* — James J Yang
*Assistant Examiner* — Kevin Lau
(74) *Attorney, Agent, or Firm* — Norton Rose Fulbright US LLP; Gerard Messina

(57) ABSTRACT

A method for wrong-way driver detection. The method includes a step of reading in map data mapping a set of road elements of a road network negotiable by a vehicle, a step of determining a plurality of particles using measured position data of the vehicle, one particle representing an assumed position of the vehicle and a weighting assigned to the assumed position, a step of determining at least one road element, which is plausible with respect to a negotiation by the vehicle, from the set of road elements based on the plurality of particles, using a particle filter; and a step of checking the at least one plausible road element, using a classification method, to obtain at least one verified road element.

14 Claims, 6 Drawing Sheets

(51) Int. Cl.
  *G08G 1/16* (2006.01)
  *G01C 21/30* (2006.01)
(52) U.S. Cl.
  CPC ........... *G08G 1/0145* (2013.01); *G08G 1/164* (2013.01); *G08G 1/166* (2013.01); *G01C 21/30* (2013.01)

(56) References Cited

OTHER PUBLICATIONS

International Search Report for PCT/EP2017/059192, dated Sep. 14, 2017.
Tao Junli et al., "Wrong Roadway Detection for Multi-Lane Roads", Aug. 27, 2013 (Aug. 27, 2013), Network and Parallel Computing; Lecture Notes in Computer Science, Springer International Publishing, pp. 50-58, XP047038828.
F. Peyet et al., "Lane-Level Positioning for Cooperative Systems Using Egnos and Enhanced Digital Maps", Mar. 31, 2008 (Mar. 31, 2008), XP055393844.
Schindler Andreas., "Vehicle Self-Localization With High-Precision Digital Maps", 2013 IEEE Intelligent Vehicles Symposium (IV), IEEE, Jun. 23, 2013 (Jun. 23, 2013), pp. 141-146.

\* cited by examiner

METHOD, DEVICE AND SYSTEM FOR WRONG-WAY DRIVER DETECTION

BACKGROUND INFORMATION

Wrong-way drivers ("ghost drivers") cause at least considerable property damage in the event of an accident. The detection based only on the navigation device (road class and direction) is too late in most instances, i.e., the wrong-way driver is already traveling (at a high driving speed and with a high probability of a collision) on the wrong lane.

SUMMARY

The present invention provides a method, a device and a system for wrong-way driver detection, and a corresponding computer program. The measures described herein allow advantageous refinements of and improvements on the device described herein.

A, for example, cloud-based wrong-way driver warning may advantageously be implemented with a detection which is adapted specifically to the case, using a particle filter.

A method for wrong-way driver detection includes the following steps:

reading in map data, which map a set of road elements of a road network negotiable by a vehicle;

determining a plurality of particles using measured position data of the vehicle, a particle representing an assumed position of the vehicle and a weighting assigned to the assumed position;

determining at least one road element, which is plausible with respect to a negotiation by the vehicle, from the set of road elements based on the plurality of particles, using a particle filter; and checking the at least one plausible road element, using a classification method, to obtain at least one verified road element.

The vehicle may be a road vehicle. Wrong-way driving may be understood to mean a drive of the vehicle on a road counter to a prescribed driving direction. The map data may furthermore map parameters of the road network negotiable by the vehicle. The measured position data of the vehicle may represent a position measured using a sensor situated in the vehicle. The plurality of particles may be determined using a method using known particle filters. The particles may have different assumed positions which, for example, are grouped around the measured position. For example, the particle filter may be used to change a weighting of existing particles. A plausible road element may be understood to mean a road element for which it is assumed, after evaluation of the particle data, that the vehicle is situated thereon. Using further available data, the plausible road element may be checked to ensure that the vehicle is actually situated on the verified road element. The verified road element may be used instead of the measured position for detecting a wrong-way drive of the vehicle.

The method may thus include a step of determining a wrong-way driving signal, using the verified road element. The wrong-way driving signal may indicate whether or not the vehicle is driving the wrong way. For example, the wrong-way driving signal may only be provided when a wrong-way drive is assumed.

In the step of checking, a classification method of machine learning may be used. Advantageously, conventional methods may thus be resorted to.

In the step of checking, measured movement data of the vehicle and parameters assigned to the road elements may be used for the classification method. The measured movement data may represent movements of the vehicle measured using a sensor. In this way, it may be checked whether a road element matches a movement carried out by the vehicle.

For example, the movement data may map a transverse acceleration and/or a driving direction of the vehicle. With the aid of the transverse acceleration, it may be checked whether a course of a road element, and with the aid of the driving direction, it may be checked whether a driving direction specification of a road element, matches the measured movement of the vehicle.

Accordingly, the parameters may map a course of a curvature and/or a driving direction specification of a road element mapped by the map data, to which at least one of the plurality of particles is assigned or assignable.

In the step of checking, an assignability of the plurality of particles to road elements mapped by the map data may be used for the classification method. In this way, it may be incorporated in the check whether or not particles are situated on the plausible road element.

In the step of checking, a distance between the plurality of particles and a measured position of the vehicle mapped by the measured position data may be used for the classification method. In this way, it may be incorporated in the check whether particles are situated close to or away from a plausible road element.

In the step of reading in, the measured position data may be read in via an interface of a so-called processor cloud. This enables a cloud-based solution.

A corresponding device for wrong-way driver detection is configured to carry out steps of the described method in corresponding units. For example, such a device may include a read-in unit, which is designed to read in map data mapping a set of road elements of a road network negotiable by a vehicle, a determination unit, which is designed to determine a plurality of particles using measured position data of the vehicle, a particle representing an assumed position of the vehicle and a weighting assigned to the assumed position, a determination unit, which is designed to determine at least one road element, which is plausible with respect to a negotiation by the vehicle, from the plurality of road elements based on the plurality of particles, using a particle filter, and a checking unit, which is designed to check the at least one plausible road element, using a classification method, to obtain at least one verified road element.

A corresponding system for wrong-way driver detection includes at least one transmitter, which is situatable or situated in a vehicle and designed to emit position data, and a described device for wrong-way driver detection, which is designed to receive the position data emitted by the at least one transmitter, for example via a wireless connection.

A further system for wrong-way driver detection includes at least one transmitter, which is situatable or situated in a vehicle and designed to emit position data, the position data representing a measured position of a vehicle, and at least one receiver unit, which is situatable or situated in a vehicle and designed to receive data of a device, which according to the approach described here for wrong-way driver detection is designed to receive the position data emitted by the at least one transmitter.

The described method may be implemented in software or hardware or in a mixed form made up of software and hardware, for example in a device.

For this purpose, the device may include at least one processing unit for processing signals or data, at least one memory unit for storing signals or data and/or at least one communication interface for reading in or outputting data, which are embedded into a communication protocol. The processing unit may be a signal processor, a microcontroller or the like, for example, it being possible for the memory unit to be a Flash memory, an EPROM or a magnetic memory unit. The communication interface may be designed to read in or output data wirelessly and/or in a wire-bound manner, a communication interface which is able to read in or output wire-bound data being able to read these data in, for example electrically or optically, from a corresponding data transmission line or output these into a corresponding data transmission line.

A device may presently be understood to mean an electrical device which processes sensor signals and outputs control and/or data signals as a function thereof. The device may include an interface which may be designed as hardware and/or software. In the case of a hardware design, the interfaces may, for example, be part of a so-called system ASIC which includes a wide variety of functions of the device. However, it is also possible for the interfaces to be separate integrated circuits, or to be at least partially made up of discrete elements. In the case of a software design, the interfaces may be software modules which are present on a microcontroller, for example, in addition to other software modules.

In addition, a computer program product or computer program is advantageous, having program code which may be stored on a machine-readable carrier or memory medium such as a semiconductor memory, a hard disk memory or an optical memory, and which is used to carry out, implement and/or activate the steps of the method according to one of the specific embodiments described above, in particular if the program product or program is executed on a computer or a device.

Exemplary embodiments of the approach described herein are shown in the figures and are described in greater detail below.

DETAILED DESCRIPTION OF EXAMPLE EMBODIMENTS

Figure 1:
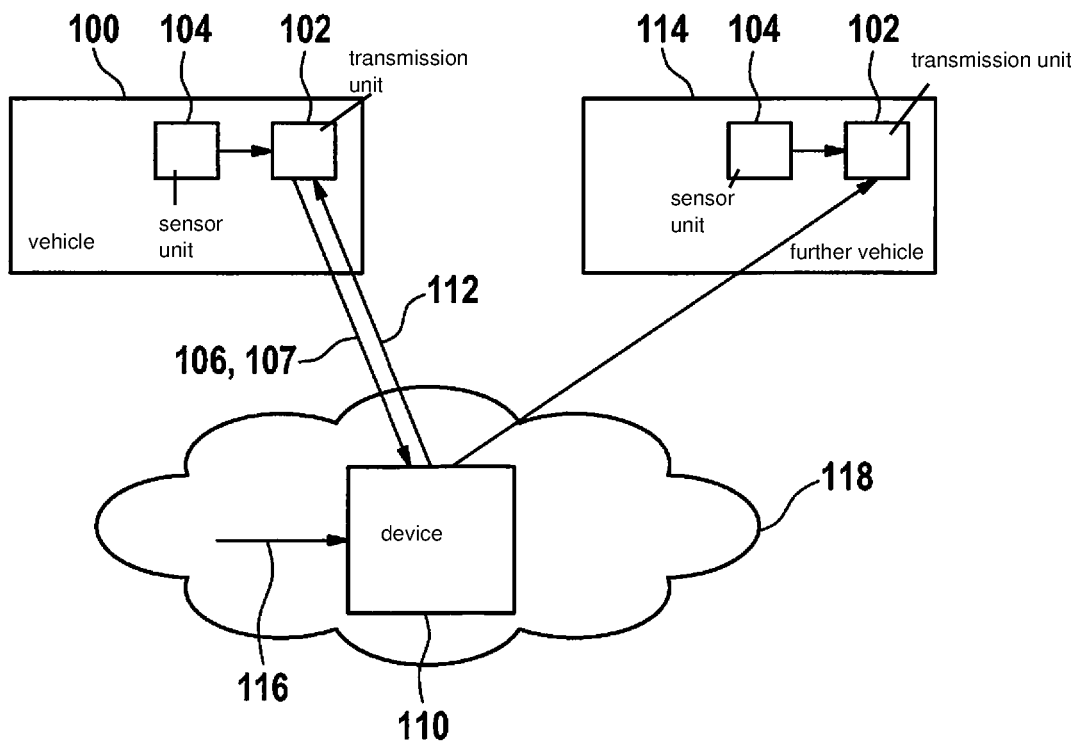
FIG. 1 shows a system for wrong-way driver detection according to one exemplary embodiment.

In the following description of favorable exemplary embodiments of the present invention, identical or similar reference numerals are used for similarly acting elements shown in the different figures, and a repeated description of these elements is dispensed with.

FIG. 1 shows a system for wrong-way driver detection according to one exemplary embodiment. The system includes a vehicle 100, which includes a transmission unit 102 designed to wirelessly emit measuring data 106, collected using at least one sensor unit 104 situated in vehicle 100, to a device 110 for wrong-way driver detection. Device 110 is designed to edit measuring data 106 into edited data and to further process the edited data, using a particle filter, to generate and emit a wrong-way driving signal 112. According to one exemplary embodiment, wrong-way driving signal 112 indicates that vehicle 100 whose measuring data 106 were processed is presently driving the wrong way. According to this exemplary embodiment, both transmission unit 102 of vehicle 100 and a transmission unit 102 of a further vehicle 114 are designed to receive the wrong-way driving signal 112 and, in response to a reception of wrong-way driving signal 112, to activate a warning unit of the respective vehicle 100, 114 which, for example, warns a driver of the respective vehicle 100, 114 about the wrong-way drive or, according to one exemplary embodiment, intervenes in an at least semi-automatic control, for example of a braking system or steering system, of the respective vehicle 100, 114. According to different exemplary embodiments, transmission unit 102 may only be designed as a transmitter or as a transceiver unit.

According to one exemplary embodiment, measuring data 106 include position data which were detected using a position determination unit of vehicle 100 and map an instantaneous position of vehicle 100. According to one further exemplary embodiment, measuring data 106 furthermore include movement data, which were detected, for example, using at least one acceleration sensor of vehicle 100 and include pieces of information concerning an instantaneous movement of vehicle 100, for example pieces of information concerning a driving direction, a longitudinal acceleration, a transverse acceleration, or concerning a rotation of the vehicle about a vehicle axis.

According to one exemplary embodiment, device 110 is designed to read in map data 116 which map a road network negotiable by vehicle 100. According to one exemplary embodiment, map data 116 include pieces of information about road elements of the road network. According to one exemplary embodiment, map data 116, with respect to each road element, furthermore include at least one parameter which, for example, defines a driving direction specification for the respective road element or a course of the respective road element. For example, it may be defined via the parameter whether the road element extends straight or follows a curve. According to one specific embodiment, device 110 includes a memory unit in which map data 116 are stored.

According to one exemplary embodiment, device 110 is, or functional blocks of device 110 are, situated or implemented in a cloud 118.

According to one exemplary embodiment, device 110 is designed to determine wrong-way driving signal 112 using a verified road element. A verified road element may be understood to mean a road element encompassed by the map data, also referred to as a road segment, for which it is assumed that vehicle 100 is situated thereon. In this case, device 110 is designed to initially determine at least one plausible road element from the road elements encompassed by the map data, using a particle filter, and subsequently, using a classification method, to check whether the at least one plausible road element may actually be assumed with high probability to be a road element on which the vehicle is situated. The particles processed by the particle filter are determined by device 110 using the position data transmitted via measuring signal 106 and/or existing particles. The classification method thus provides an additional safeguard with the aid of which it may be ensured that the wrong-way driver warning is not output erroneously because the vehicle was assigned to an incorrect road element. In this way, device 110 may be designed to provide wrong-way driving signal 112 using a verified road element.

The described approach may be used in addition or as an alternative to a variety of methods for detecting a wrong-way driver in which, e.g., a video sensor system is used to detect the passing of a "do not enter" sign or the use of a digital map in conjunction with a navigation is utilized to identify a detection of a wrong driving direction on a road element which is only negotiable in one direction. Furthermore, the approach may be combined with wireless methods, which detect wrong-way drivers with the aid of infrastructure, such as markers in the roadway or on the roadside.

In addition to detecting a wrong-way driver, the present invention may offer many options for responding to a wrong-way driver. Examples include the warning of the wrong-way driver directly via a display or acoustic instructions. It is also possible to use methods by which other drivers in the vicinity of a wrong-way driver are warned, e.g., via vehicle-to-vehicle communication or with the aid of mobile communication. Furthermore, it is possible to warn other road users via variable message signs mounted along the roadside. It is also possible for an intervention in the engine control unit or brake of the vehicle 100 driving the wrong way to take place.

The described approach makes it possible to detect a wrong-way driver and to warn other road users in his or her vicinity in a timely manner, for which only very little time is available.

The described approach applies to a wrong-way driver detection with a client-server solution. A client shall be understood to mean a device, situated on or in a motor vehicle, which has an Internet connection and at least access to position coordinates. For example, it may be transmission unit 102. Transmission unit 102 may be a smart phone, for example. Sensor unit 104 may be integrated into transmission unit 102. In this way, wrong-way driver-specific server-client communication may be implemented with a smart phone as an exemplary client. The smart phone may be connected via a mobile communication network with the aid of a gateway (PDN_GW) to the Internet, in which device 110 may be situated, for example in the form of a server.

From the possible functionalities of a wrong-way driver warning using a client-server solution, the following exemplary problem areas arise for this technology, which are addressed by embodiments of the present invention described herein:

a) False Positive Reduction

False positives, i.e., misdetections in the case of correct driving, must be reduced as much as possible, or completely avoided, in the case of a driver warning and/or an active intervention. Depending on the warning concept, the standards up to ASIL A must be met.

b) Time-Critical Execution of the Trigger Chain

To keep the risk for other road users originating from a wrong-way driver as low as possible, an intervention and/or warning should take place as quickly as possible. This means, the entire functional chain from the detection of a critical situation, through the detection of a wrong-way driver, to the intervention or warning should be run through in a preferably short time period. The utilization and thus the necessary performance capability of the server, for example of device 110, during a comprehensive use of this function plays a very important role. In addition to the trigger time, the economic efficiency also represents an important sub-aspect.

c) Communication, Data Efficiency and Power Consumption

The communication and the power consumption must be as efficient and as low as possible, especially for mobile devices, to achieve an acceptable rechargeable battery operating time. The overloading of a mobile communication cell or other wireless communication unit also has to be suppressed by a data-efficient communication. In addition, the data volume and the associated costs have to be limited to the extent possible. The efficiency of the communication is also an extremely important factor on the server side for reasons of processing performance.

The described approach covers especially the key areas a) "false positive reduction" and b) "time-critical execution of the trigger chain", but c) "communication, data efficiency and power consumption" is also possibly influenced. The detection of wrong-way drivers in cloud 118, based on commercially available smart phone and connectivity control unit sensor systems, is no trivial undertaking.

Figure 2:
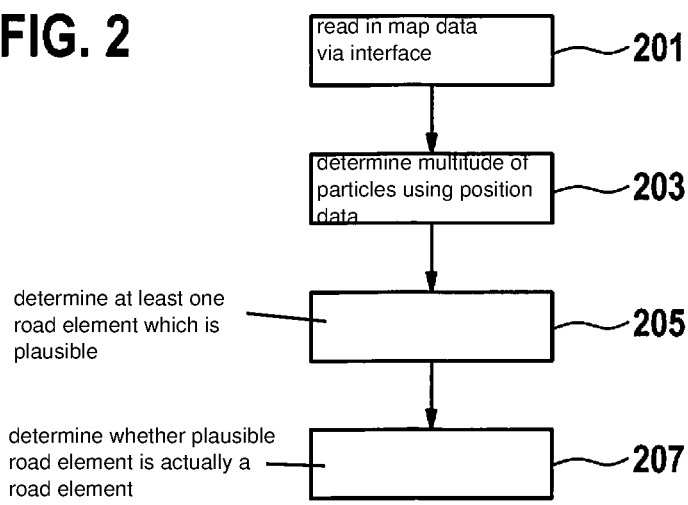
FIG. 2 shows a flow chart of a method for wrong-way driver detection according to one exemplary embodiment.

FIG. 2 shows a flow chart of an example method for wrong-way driver detection according to one exemplary embodiment. For example, the method may be carried out using units of the device shown in FIG. 1 for wrong-way driver detection.

The method includes a step 201 in which map data are read in via an interface. The map data map a road network negotiable by a vehicle. In a step 203, a plurality of particles is determined, using position data. Each of the particles represents an assumed position of the vehicle and a weighting assigned to the assumed position. According to one exemplary embodiment, the assumed positions are distributed around the measured position. In a step 205, at least one road element which is plausible with respect to a negotiation by the vehicle is determined from the set of road elements based on the plurality of particles. At least step 205 is carried out using a particle filter. For example, a road element may be determined as a plausible road element as a function of a local distribution of the particles or the weightings of the particles. For this purpose, it may be checked, for example, whether a predetermined set of particles is situated on the road element or particles having a predetermined weighting are situated on the road element. In a step 207, it is checked whether the at least one plausible road element is actually a road element, for which it may be assumed with sufficiently high certainty that the vehicle is situated thereon. For this purpose, the at least one plausible road element is checked, using a classification method. According to one exemplary embodiment, a road element checked by the classification method is either referred to as a verified road element or discarded as an implausible road element, as a function of a result of the classification carried out by the classification method. In this way, the classification method may be used to classify road elements filtered out as plausible road elements, using the particle filter, either as verified road elements or as implausible road elements.

For example, movement data of the vehicle and parameters assigned to the plausible road elements may be incorporated in the classification method. It is also possible to incorporate values which are based on an evaluation of the particles. For example, a local arrangement and/or weighting of the particles may be considered in the evaluation. Such values may indicate, for example, how many of the particles may be assigned to a plausible road element. If the number of particles which are assigned to a plausible road element, for example, is higher than a threshold value, the plausible road element may be classified as a verified road element.

In a further step, a wrong-way driving signal is provided according to one exemplary embodiment. For example, the wrong-way driving signal is provided when an instantaneous driving direction of the vehicle does not agree with a driving direction specification of the verified road element.

It is not crucial for the wrong-way driver detection to know which route the wrong-way driver traveled. The information which is required is mainly where the wrong-way driver is presently situated, and whether he or she is traveling a road counter to the driving direction. For this ascertainment, the history is required, of course, which, however, is not part of the problem, but rather the path to the result.

Based on these circumstances, a method based on a particle filter is introduced. Similarly to the Kalman filter, the particle filter may be used for systems which are subject to a hidden Markov chain characteristic, i.e., a Markov chain with unobserved states.

Figure 3:
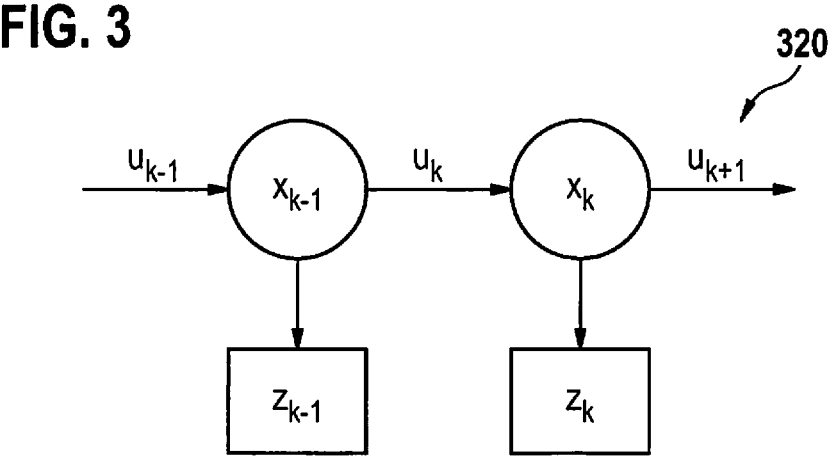
FIG. 3 shows a hidden Markov chain model.

FIG. 3 shows a hidden Markov chain model 320 including state x and observation z at times k and k−1.

This means, the state of a system cannot be measured directly, but may be estimated based on other observations. In this case, the position and thus the instantaneous road must be estimated. For this purpose, the following equation must be solved:

$$p(x_k|z_{0:k},u_{0:k}) = \eta \cdot g(z_k|x_k,z_{0:k-1},u_{0:k})\pi(x_k|z_{0:k},u_{0:k})$$

The state at point in time k is described hereafter with $x_k$, and the previous states are summarized with $x_{0|k-1} = (x_0, \ldots, x_{k-1})$. Analogously to x, this convention also applies to control variables u and observations u. $\eta$ describes a normalization term, which hereafter, however, is not of great importance. This equation may be simplified to the following equation:

$$p(x_k|z_{0:k},u_{0:k}) = \eta \cdot g(z_k|x_k)\int_{x_{k-1}} f(x_k|x_{k-1},u_k)p(x_{k-1}|z_{0:k},u_{0:k})dx_{k-1}$$

And this is described in two steps: the prediction step $$\pi(x_k|z_{0:k-1},u_{0:k}) = \int_{x_{k-1}} \underbrace{f(x_k|x_{k-1},u_k)}_{motion} p(x_{k-1}|z_{0:k-1},u_{0:k})dx_{k-1}$$

and the weighting term:

$$p(x_k|z_{0:k},u_{0:k}) = \eta \cdot \underbrace{g(z_k|x_k,u_k)}_{observations} \pi(x_k|z_{0:k-1},u_{0:k}).$$

In the case of a particle filter, the integral is solved via the probability distributions using a numerical approximation $$\pi(x) = \sum_{j=1}^{J} w^{[j]} \delta(x - x^{[j]})$$

and Monte Carlo methods. $w^{[j]}$ describes the weight/the probability of each jth particle. A set of particles is described with $$X = \{(x^{[j]}, w^{[j]})\}_{j=1,\ldots,J}$$

In this way, each particle has the weight $w^{[j]}$ and the state $x^{[j]}$.

Figure 4:
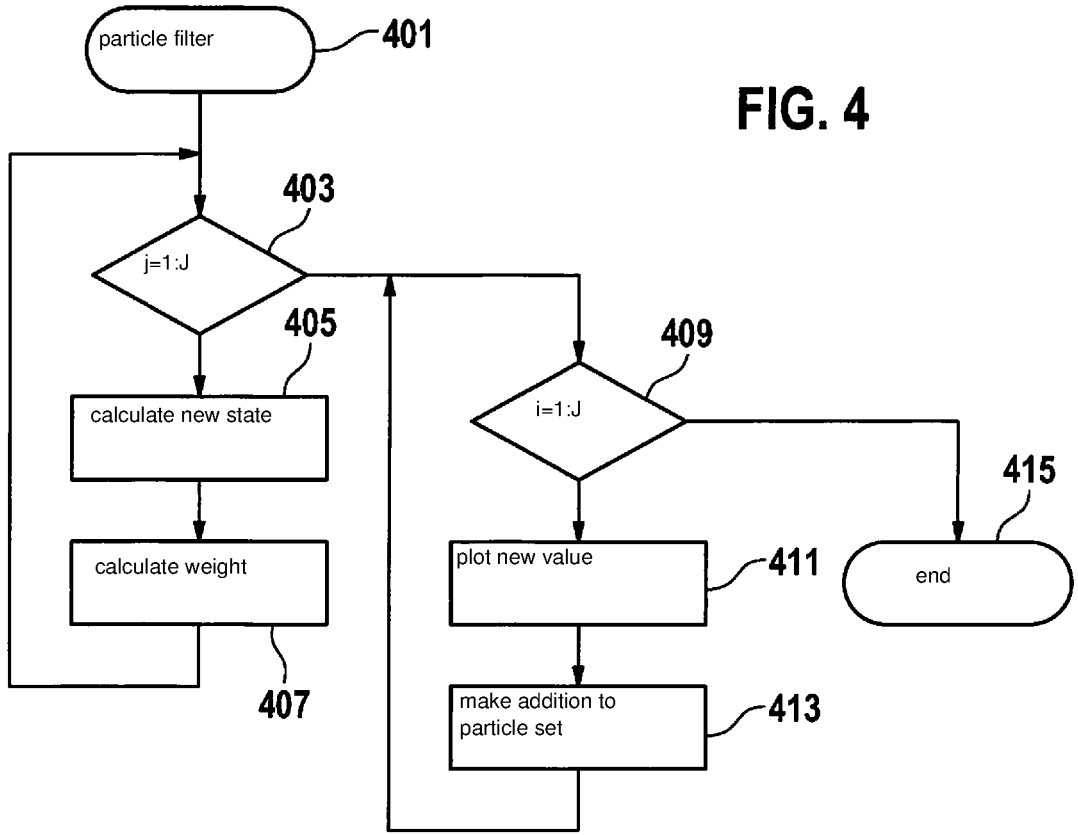
FIG. 4 shows a sequence of a particle filter process according to one exemplary embodiment.

FIG. 4 shows the sequence of a particle filter process according to one exemplary embodiment. For this purpose, FIG. 4 shows a hidden Markov chain model having state x and observation z at times k and k−1.

A large portion of the work is to find a suitable function for $$\underbrace{f(x_k|x_{k-1},u_k)}_{motion}$$

and $$\underbrace{g(z_k|x_k,u_k)}_{observations}$$

which optimally display the problem. For this, it is essential to define states x to be estimated.

Block 401 denotes the particle filter $(X_{k-1}, u_k)$.

From block 403, jumps are made to block 405 until all values j=1:J have been run through.

In block 405, a new state is calculated:

$$X_k^{[j]} = f(X_k|X_{k-1}^{[j]},u_k)$$

In block 407, the weight is calculated:

$$w_k^{[j]} = g(z_k,m_i|X_k,u_k)$$

When all values have been run through in block 403, a jump to block 409 occurs. From block 409, jumps are made to block 411 until all values i=1:J have been run through.

In block 411, a new value according to $w_k^{[i]}$ is plotted.

In block 413, an addition is made to the particle set according to $x_k^{[i]} \rightarrow X_k$.

When all values have been run through in block 409, a jump to block 415 occurs, which represents the end $X_k$.

Figure 5:
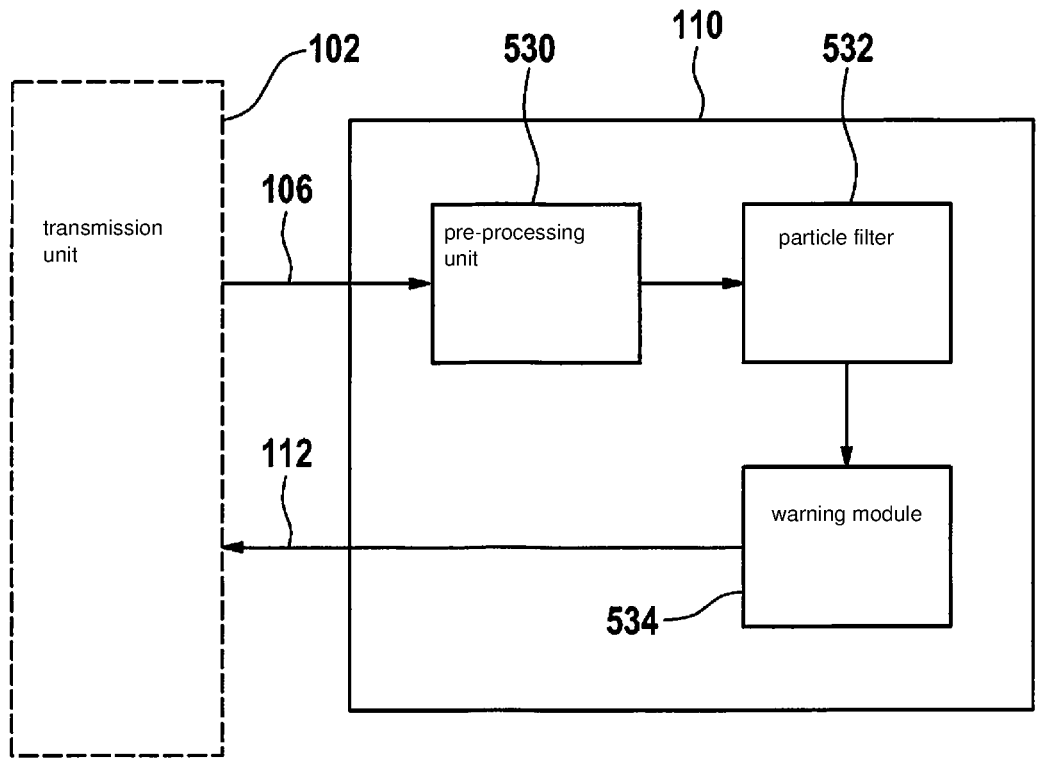
FIG. 5 shows a system for wrong-way driver detection according to one exemplary embodiment.

FIG. 5 shows a system for wrong-way driver detection according to one exemplary embodiment. The system includes units 102, for example in the form of the transmission units described based on FIG. 1, and a device 110 for wrong-way driver detection, which according to this exemplary embodiment is designed as a so-called WDW server. Device 110 is designed to receive data 106, for example measuring data described based on FIG. 1, from unit 102, and to provide a warning 112 based on data 106 and send them back to units 102, for example in the form of the wrong-way driving signal described based on FIG. 1.

The device includes a unit 530 for preprocessing, a particle filter 532 and a warning module 534.

Particle filter 532 is embedded in a simplified architecture of a cloud-based wrong-way driver warning as shown in FIG. 5.

Using particle filter 532, it is possible to approximately determine the probability distribution of the position of the car.

Figure 6:
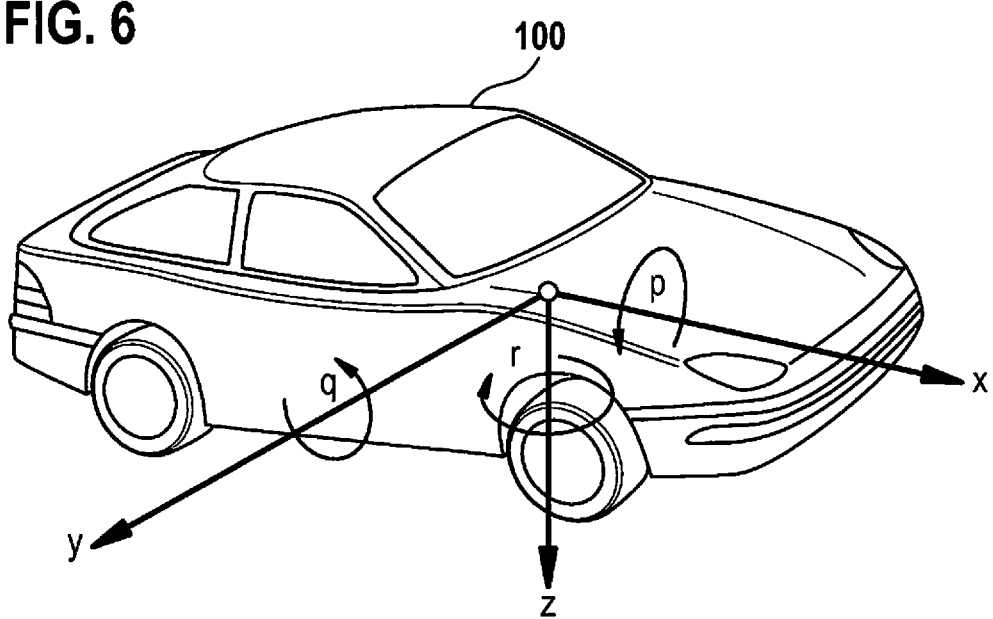
FIG. 6 shows a vehicle according to one exemplary embodiment.

Based on a vehicle 100, FIG. 6 shows values which may be incorporated into the model shown based on FIG. 5. The values may, for example, be states in the direction of longitudinal axis x, transverse axis y, vertical axis z and a rolling p about the longitudinal axis, a pitching q about the transverse axis, and a yawing r about the vertical axis.

With respect to a map matching using the particle filter, for the Bayes filter $p[(x|z_{0|k},u_{0|k})$ applies. With reference to FIG. 3, $x_k$ may denote what the state (not measured) is, for example the geographical longitude, latitude and altitude, $u_{k+1}$ may denote how vehicle 100 is moving, for example with respect to the speed and rotation rates, and $z_k$ may denote what may be observed, for example a GPS signal or a signal regarding the surroundings of vehicle 100 (camera, etc.).

Figure 7:
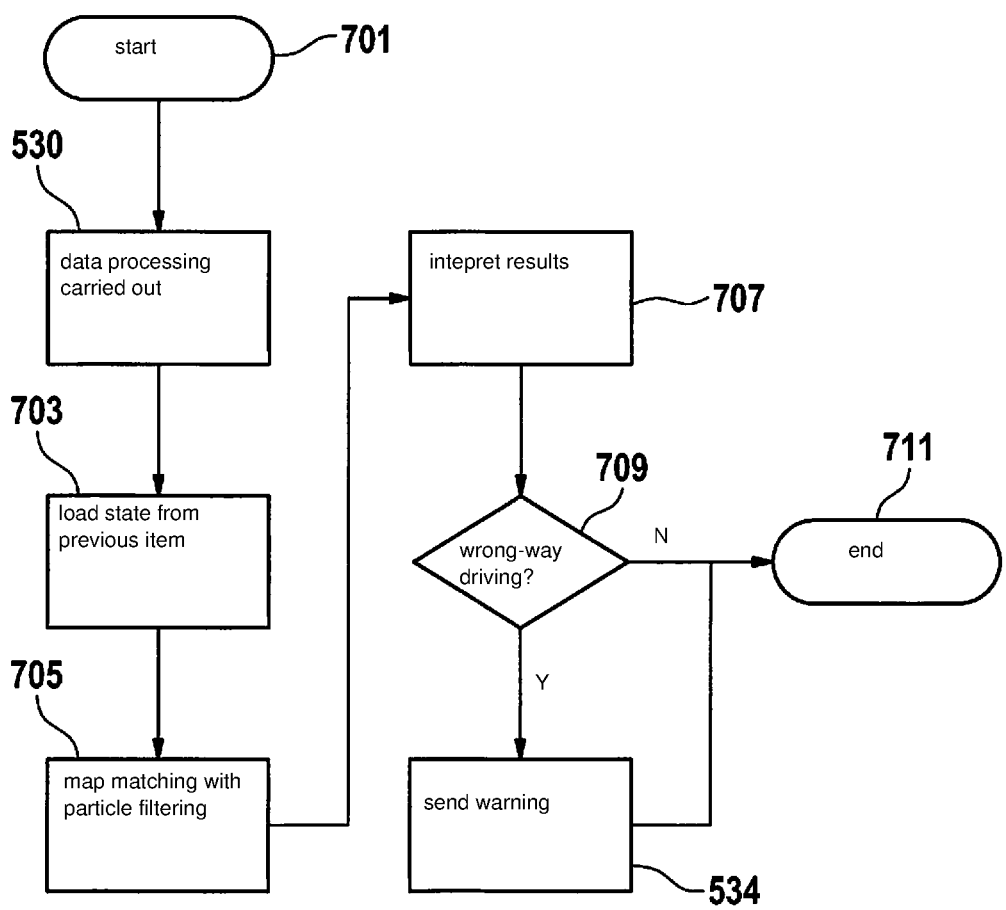
FIG. 7 shows a program sequence according to one exemplary embodiment.

FIG. 7 shows a program sequence according to one exemplary embodiment. The sequence starts with a block 701. In a block 530, a data preprocessing is carried out, as is described based on FIG. 5, for example. In a block 703, if present, the state from the previous item is loaded. In a block 705, a map matching with the particle filter takes place. In a block 707, an interpretation of the results takes place. In a block 709, it is checked whether a wrong-way driving is occurring. If this is the case, a warning is sent in a block 534, as is described based on FIG. 5, for example. If no wrong-way driving is occurring, the end of the program sequence takes place with a block 711.

Figure 8:
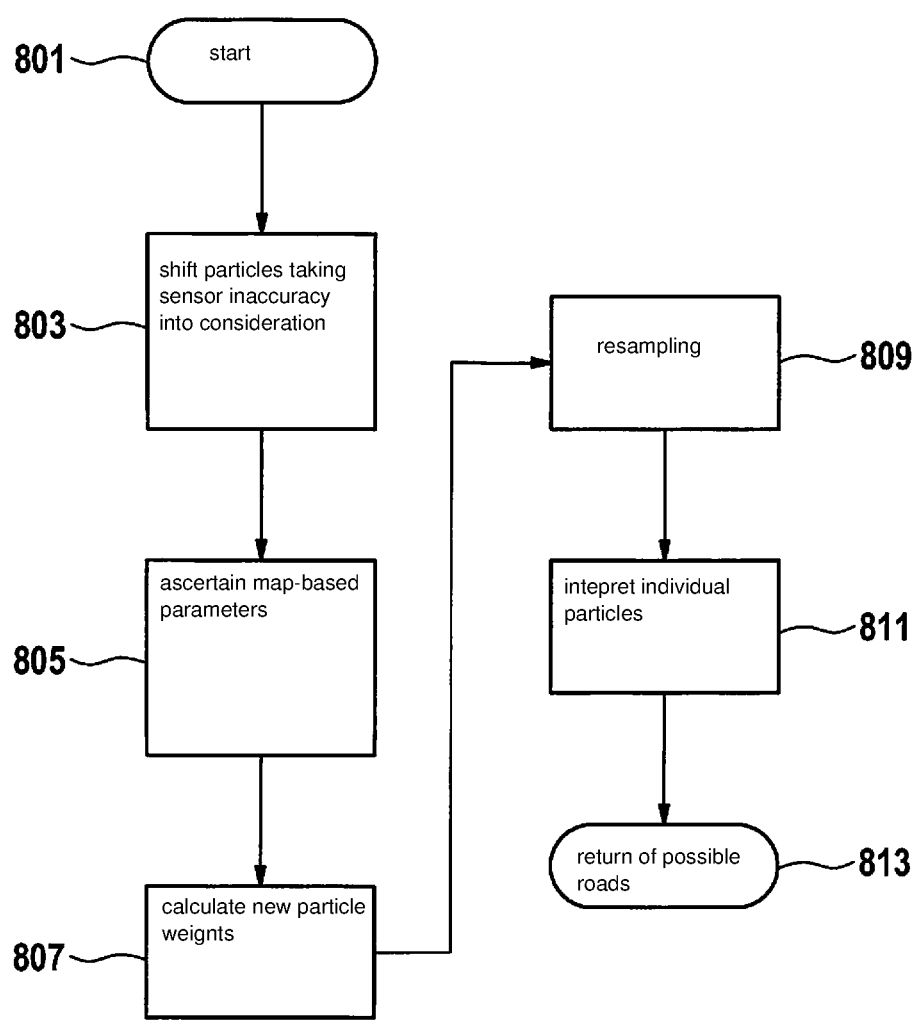
FIG. 8 shows a program sequence of a particle filter according to one exemplary embodiment.

FIG. 8 shows a program sequence of a particle filter according to one exemplary embodiment. A block 801 denotes a start of the particle filter. In a block 803, a shifting of the particles takes place, taking the sensor inaccuracy into consideration, for example of the sensor unit described based on FIG. 1. In a block 805, an ascertainment of the map-based parameters takes place. Such a parameter indicates, for example, whether a particle is situated on a road or what the name thereof is. In a block 807, a calculation of the new particle weights takes place. In a block 809, a so-called resampling takes place, in which the irrelevant areas and/or particles are eliminated. In a block 811, an interpretation of the individual particles takes place, and in a block 813, a return of the possible roads takes place.

By using the particle filter, the aspects described below are improved. On the one hand, a sequentially (possible in real time) operating method is created, which primarily ascertains the instantaneous position on the road network. Furthermore, a robust estimation of the instantaneous position on the road network is possible. An uncertainty is ascertainable via the instantaneous estimation. This makes it possible to be able to reliably delay the decision about a potential wrong-way driving, to a useful degree.

Figure 9:
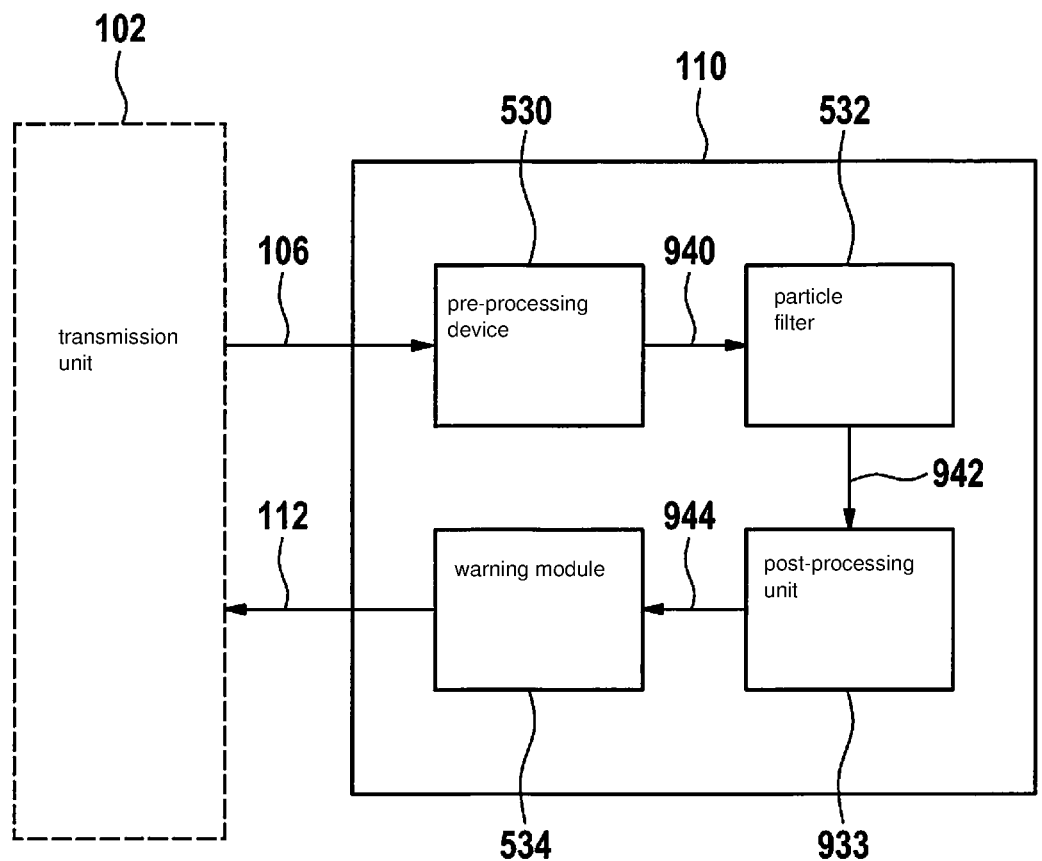
FIG. 9 shows a system for wrong-way driver detection according to one exemplary embodiment.

FIG. 9 shows a system for wrong-way driver detection according to one exemplary embodiment. The system corresponds to the system described based on FIG. 5, with the difference that a unit 933 for carrying out a post-processing is provided between particle filter 532 and warning module 534. Unit 933 is designed to implement a classification method, for example of machine learning here.

According to one exemplary embodiment, particle filter 532 is designed to process particles 940 and, based on particles 940, to determine at least one plausible road element 942, from which it is assumed, proceeding from the data provided by the particle filter 532, that a vehicle is situated thereon. Unit 933 is designed to check whether plausible road element 942 is actually a road element, of which it may be assumed with sufficiently high certainty that the vehicle is situated thereon. If this is the case, unit 933 is designed to provide checked plausible road element 942 as verified road element 944 to warning module 534. Warning module 534 is designed to provide the warning in the form of a wrong-way driving signal 112 using verified road element 944.

The typical use of particle filter 532 differs to the effect that, in this application, the goal is not to achieve the best possible localization accuracy, but to ascertain, in all cases, the correct road elements, verified road elements 944 here. This means that, even if sensor data 106 indicate that a wrong-way drive is occurring, a warning should only be issued to the traffic at risk if there truly is certainty that a wrong-way drive in fact exists. To reduce the misdetection rate, a classification method 933 is additionally used, for example from the field of machine learning. This changes the structure of the system shown in FIG. 5, as is shown in FIG. 9.

Instead of triggering solely based on the calculated probabilities, the cases are additionally double-checked with the aid of a classification method 933 of machine learning.

Possible parameters (features) for the classification method 933, including the behavior/change over time thereof, are the following:

The distance of a road, on which particles are situated counter to the driving direction, from the road situated spatially the closest thereto on which particles are moving in the driving direction.

The probabilities of the possible roads on which particles are situated.

The difference between the curvature of the road on which particles are situated and sensor data 106.

The difference between the driving direction specification of the road on which particles are situated and sensor data 106 or particles 940.

A very large number of particles is shifted in such a way that they do not end up on a road (off-road probability).

The median/mean value/minimum value/maximum value of the distance between particles and the measured vehicle position (GPS) is unusually high.

An estimated convergence of particle filter 532 for the estimation of the overall error.

Possible methods which lend themselves for classification method 933 are, for example, regressions, k-nearest neighbor, decision trees, decision tree ensemble or random forest, support vector machine (SVL) or neural networks.

The described approach may be used in connection with a cloud-based wrong-way driver warning with a detection which is specifically adapted to the application, using a particle filter. Particularly advantageous are the conditions for the two described fallback levels and the approach when roads are found again.

If one exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method for wrong-way driver detection, the method comprising:
    reading in map data, the map including a set of road elements of a road network negotiable by a vehicle;
    determining a plurality of particles using measured position data of the vehicle, each of the plurality of particles representing an assumed position of the vehicle and a weighting assigned to the assumed position, wherein the assumed positions of the vehicle include positions distributed around the measured position of the vehicle;
    determining at least one road element, which is plausible with respect to a negotiation by the vehicle, from the set of road elements based on the plurality of particles, using a particle filter; and
    verifying that the determined at least one plausible road element is at least one actual road element, using a classification method, to obtain at least one verified road element, wherein in the step of verifying, measured movement data of the vehicle and parameters assigned to the road elements are used for the classification method to verify that the determined at least one plausible road element is the at least one actual road element.

2. The method as recited in claim 1, further comprising: providing a wrong-way driving signal using the at least one verified road element, the wrong-way driving signal indicating whether or not a wrong-way drive of the vehicle is occurring.

3. The method as recited in claim 1, wherein in the step of verifying, a classification method of machine learning is used to verify that the determined at least one plausible road element is the at least one actual road element.

4. The method as recited in claim 1, wherein the movement data map a transverse acceleration and/or a driving direction of the vehicle.

5. The method as recited in claim 1, wherein the parameters map a course of a curvature and/or a driving direction specification of a road element mapped by the map data, to which at least one of the plurality of particles is assigned.

6. The method as recited in claim 1, wherein in the step of verifying, an assignability of the plurality of particles to road elements mapped by the map data is used for the classification method to verify that the determined at least one plausible road element is the at least one actual road element.

7. The method as recited in claim 1, wherein in the step of verifying, a distance between the plurality of particles and a measured position of the vehicle mapped by the measured position data is used for the classification method to verify that the determined at least one plausible road element is the at least one actual road element.

8. The method as recited in claim 1, further comprising: reading in the measured position data via an interface of a processor cloud.

9. A device for wrong-way driver detection, the device configured to:
read in map data, the map including a set of road elements of a road network negotiable by a vehicle;
determine a plurality of particles using measured position data of the vehicle, each of the plurality of particles representing an assumed position of the vehicle and a weighting assigned to the assumed position, wherein the assumed positions of the vehicle include positions distributed around the measured position of the vehicle;
determine at least one road element, which is plausible with respect to a negotiation by the vehicle, from the set of road elements based on the plurality of particles, using a particle filter; and
verify that the determined at least one plausible road element is at least one actual road element, using a classification method, to obtain at least one verified road element, wherein in the verification, measured movement data of the vehicle and parameters assigned to the road elements are used for the classification method to verify that the determined at least one plausible road element is the at least one actual road element.

10. A system for wrong-way driver detection, the system comprising:
at least one transmitter situated in a vehicle and designed to emit position data, the position data representing a measured position of a vehicle; and
a device for wrong-way driver detection, the device configured to:
read in map data, the map including a set of road elements of a road network negotiable by a vehicle;
determine a plurality of particles using measured position data of the vehicle, each of the plurality of particles representing an assumed position of the vehicle and a weighting assigned to the assumed position, wherein the assumed positions of the vehicle include positions distributed around the measured position of the vehicle;
determine at least one road element, which is plausible with respect to a negotiation by the vehicle, from the set of road elements based on the plurality of particles, using a particle filter; and
verify that the at least one plausible road element is at least one actual road element, using a classification method, to obtain at least one verified road element, wherein in the verification, measured movement data of the vehicle and parameters assigned to the road elements are used for the classification method to verify that the determined at least one plausible road element is the at least one actual road element.

11. A non-transitory machine-readable memory medium on which is stored a computer program for wrong-way driver detection, the computer program, when executed by a computer, causing the computer to perform:
reading in map data, the map including a set of road elements of a road network negotiable by a vehicle;
determining a plurality of particles using measured position data of the vehicle, each of the plurality of particles representing an assumed position of the vehicle and a weighting assigned to the assumed position, wherein the assumed positions of the vehicle include positions distributed around the measured position of the vehicle;
determining at least one road element, which is plausible with respect to a negotiation by the vehicle, from the set of road elements based on the plurality of particles, using a particle filter; and
verifying that the determined at least one plausible road element is at least one actual road element, using a classification method, to obtain at least one verified road element, wherein in the step of verifying, measured movement data of the vehicle and parameters assigned to the road elements are used for the classification method to verify that the determined at least one plausible road element is the at least one actual road element.

12. The device as recited in claim 9, wherein the device is further configured to:
provide a wrong-way driving signal using the at least one verified road element, the wrong-way driving signal indicating whether or not a wrong-way drive of the vehicle is occurring.

13. The system as recited in claim 10, wherein the device is further configured to:
provide a wrong-way driving signal using the at least one verified road element, the wrong-way driving signal indicating whether or not a wrong-way drive of the vehicle is occurring.

14. The non-transitory machine-readable memory medium as recited in claim 11, wherein the computer program, when executed by the computer, further causes the computer to perform:
providing a wrong-way driving signal using the at least one verified road element, the wrong-way driving signal indicating whether or not a wrong-way drive of the vehicle is occurring.

* * * * *